(12) United States Patent
Fevre et al.

(10) Patent No.: US 10,653,142 B2
(45) Date of Patent: May 19, 2020

(54) POLYMERS WITH ANTIMICROBIAL FUNCTIONALITIES

(71) Applicants: International Business Machines Corporation, Armonk, NY (US); Agency for Science, Technology and Research, Connexis (SG)

(72) Inventors: Mareva B. Fevre, San Jose, CA (US); James L. Hedrick, Pleasanton, CA (US); Nathaniel H. Park, San Jose, CA (US); Victoria A. Piunova, Los Gatos, CA (US); Pang Kern Jeremy Tan, Singapore (SG); Chuan Yang, Hillington Green (SG); Yi Yan Yang, Singapore (SG)

(73) Assignees: INTERNATIONAL BUSINESS MACHINES CORPORATION, Armonk, NY (US); AGENCY FOR SCIENCE, TECHNOLOGY AND RESEARCH, Connexis (SG)

(*) Notice: Subject to any disclaimer, the term of this patent is extended or adjusted under 35 U.S.C. 154(b) by 51 days.

(21) Appl. No.: 15/839,270

(22) Filed: Dec. 12, 2017

(65) Prior Publication Data
US 2019/0174756 A1  Jun. 13, 2019

(51) Int. Cl.
*A01N 25/10* (2006.01)
*A01N 33/12* (2006.01)
*A01N 43/50* (2006.01)
*C08G 69/00* (2006.01)
*C08G 73/06* (2006.01)
*A01N 37/22* (2006.01)
*C08G 73/02* (2006.01)

(52) U.S. Cl.
CPC .......... *A01N 37/22* (2013.01); *A01N 33/12* (2013.01); *A01N 43/50* (2013.01); *C08G 69/00* (2013.01); *C08G 73/0293* (2013.01); *C08G 73/0616* (2013.01); *C08G 2230/00* (2013.01)

(58) Field of Classification Search
CPC ........ A01N 37/22; A01N 33/12; A01N 43/50; C08G 69/00; C08G 73/0293; C08G 73/0616; C08G 2230/00
See application file for complete search history.

(56) References Cited

U.S. PATENT DOCUMENTS

| | | | |
|---|---|---|---|
| 3,632,623 A | 1/1972 | Becke et al. | |
| 4,013,507 A | 3/1977 | Rembaum | |
| 4,032,596 A | 6/1977 | Uffner et al. | |
| 4,094,827 A | 6/1978 | McEntire | |
| 4,166,894 A | 9/1979 | Schaper | |
| 4,348,536 A | 9/1982 | Blahak et al. | |
| 4,698,391 A | 10/1987 | Yacobucci et al. | |
| 4,794,031 A | 12/1988 | Leir et al. | |
| 4,883,655 A | 11/1989 | Login et al. | |
| 5,419,897 A | 5/1995 | Drake et al. | |
| 5,681,862 A | 10/1997 | Hollis et al. | |
| 6,767,549 B2 | 7/2004 | Mandeville, III et al. | |
| 6,955,806 B2 | 10/2005 | Fitzpatrick et al. | |
| 8,541,477 B2 | 9/2013 | Alabdulrahman et al. | |
| 2006/0002889 A1 | 1/2006 | Fitzpatrick | |
| 2007/0025954 A1 | 2/2007 | Fitzpatrick et al. | |
| 2007/0106061 A1 | 5/2007 | Zollinger et al. | |
| 2012/0202979 A1 | 8/2012 | Wu | |
| 2013/0281515 A1 | 10/2013 | Coady et al. | |
| 2014/0275469 A1 | 9/2014 | Dhal et al. | |
| 2015/0038392 A1 | 2/2015 | Scheuing et al. | |
| 2016/0374335 A1 | 12/2016 | Chan et al. | |
| 2016/0375150 A1 | 12/2016 | Wu | |

FOREIGN PATENT DOCUMENTS

| | | | |
|---|---|---|---|
| CN | 1192649 A | | 9/1998 |
| CN | 1254334 A | | 5/2000 |
| CN | 1518621 A | | 8/2004 |
| CN | 101426507 A | | 5/2009 |
| CN | 101646728 A | | 2/2010 |
| CN | 105482105 A | | 4/2016 |
| GB | 2000164 A | * | 1/1979 |
| JP | H03255139 A | | 11/1991 |
| JP | 2004-224734 A | | 8/2004 |
| JP | 2008214529 A | | 9/2008 |
| WO | 97/02744 A1 | | 1/1997 |
| WO | 98/54140 A1 | | 12/1998 |
| WO | 02/080939 A2 | | 10/2002 |
| WO | 02/099192 A2 | | 12/2002 |
| WO | 2016/178634 A1 | | 11/2016 |

(Continued)

OTHER PUBLICATIONS

Liu, et al., Highly potent antimicrobial polyionenes with rapid killing kinetics, skin biocompatibility and in vivo bactericidal activity, Biomaterials, 2017, pp. 36-48, vol. 127.

Williams, et al., Recent advances in the synthesis and structure-property relationships of ammonium ionenes, Progress in Polymer Science, 2009, pp. 762-782, vol. 34.

Narita, et al., Effects of charge density and hydrophobicity of ionene polymer on cell binding and viability, Colloid Polym. Sci, 2000, pp. 884-887.

(Continued)

Primary Examiner — Alma Pipic

(74) Attorney, Agent, or Firm — Amin, Turocy & Watson, LLP

(57) ABSTRACT

Techniques regarding polymers with antimicrobial functionality are provided. For example, one or more embodiments described herein can regard a polymer, which can comprise a repeating ionene unit. The repeating ionene unit can comprise a cation distributed along a degradable backbone. The degradable backbone can comprise a terephthalamide structure. Further, the repeating ionene unit can have antimicrobial functionality.

15 Claims, 10 Drawing Sheets

(56) References Cited

FOREIGN PATENT DOCUMENTS

WO  2016/186581 A1  11/2016
WO  2016/209732 A1  12/2016

OTHER PUBLICATIONS

Mattheis, et al., Closing One of the Last Gaps in Polyionene Compositions: Alkyloxyethylammonium Ionenes as Fast-Acting Biocides, Macromolecular Bioscience, 2012, pp. 341-349, vol. 12.
Strassburg, et al., Nontoxic, Hydrophilic Cationic Polymers—Identified as Class of Antimicrobial Polymers, Macromolecular Bioscience, 2015, pp. 1710-1723, vol. 15.
Mayr, et al., Antimicrobial and Hemolytic Studies of a Series of Polycations Bearing Quaternary Ammonium Moieties: Structural and Topological Effects, International Journal of Molecular Sciences, 2017, 8 pages, vol. 18, No. 303.
Tamami, Synthesis and Characterization of Ammonium Ionenes Containing Hydrogen Bonding Functionalities, Dec. 6, 2012, 108 pages, Virginia Polytechnic Institute and State University.
Brown et al., The Structure Activity Relationship of Urea Derivatives as Anti-Tuberculosis Agents, Bioorg Med Chem. Sep. 15, 2011, pp. 5585-5595 vol. 19, No. 18.
Williams, Influence of Electrostatic Interactions and Hydrogen Bonding on the Thermal and Mechanical Properties of Step-Growth Polymers, Oct. 21, 2008, 375 pages, Virginia Polytechnic Institute and State University.
International Search Report and Written Opinion for PCT Application Serial No. PCT/IB2018/059624 dated Apr. 17, 2019, 8 pages.
Non-Final Office Action for U.S. Appl. No. 15/839,388 dated Jul. 10, 2019, 52 pages.
Murakami et al., "Syntheses of Macrocyclic Enzyme Models, Part 4. Preparation and Characterization of Cationic Octopus Azaparacyclophanes", Organic and Bio-Organic Chemistry, Journal of the Chemical Society, Perkin Transactions 1, Issue 11, Jan. 1, 1981, pp. 2800-2808.
Non-Final Office Action for U.S. Appl. No. 15/839,199 dated Jun. 26, 2019, 66 pages.
Tiecco et al., "Biocidal and inhibitory activity screening of de novo synthesized surfactants against two eukaryotic and two prokaryotic microbial species", Science Direct, Colloids and Surfaces B: Biointerfaces, vol. 111, Nov. 1, 2013, 35 pages.
Non-Final Office Action for U.S. Appl. No. 15/839,402 dated Jun. 26, 2019, 56 pages.
Odagi et al., "Origin of Stereocontrol in Guanidine-Bisurea Bifunctional Organocatalyst That Promotes α-Hydroxylation of Tetralone-Derived β-Ketoesters: Asymmetric Synthesis of β- and γ-Substituted Tetralone Derivatives via Organocatalytic Oxidative Kinetic Resolution", Journal of the American Chemical Society, Jan. 2015, pp. 1909-1915.
Magri et al., "Rethinking the old antiviral drug moroxydine: Discovery of novel analogues as anti-hepatitis C virus (HCV) agents", Bioorganic and Medicinal Chemistry Letters, vol. 25, No. 22, Nov. 2015, pp. 5372-5376.
Non-Final Office Action for U.S. Appl. No. 15/839,415 dated Jul. 10, 2019, 29 pages.
International Search Report and Written Opinion for PCT Application Serial No. PCT/IB2018/059621 dated Apr. 10, 2019, 8 pages.
International Search Report and Written Opinion for PCT Application Serial No. PCT/IB2018/059622, dated Mar. 28, 2019, 9 pages.
International Search Report and Written Opinion for PCT Application Serial No. PCT/IB2018/059626, dated Apr. 15, 2019, 8 pages.
International Search Report and Written Opinion for PCT Application Serial No. PCT/IB2018/059620, dated Mar. 27, 2019, 11 pages.
Final Office Action for U.S. Appl. No. 15/839,199 dated Sep. 26, 2019, 25 pages.
Non-Final Office Action for U.S. Appl. No. 15/839,397 dated Sep. 17, 2019, 47 pages.
Wettig et al., "Thermodynamic and aggregation properties of aza- and imino-substituted gemini surfactants designed for gene delivery", Physical Chemistry Chemical Physics, vol. 9, 2007, pp. 871-877.
Notice of Allowance for U.S. Appl. No. 15/839,402 dated Oct. 24, 2019, 113 pages.
Chahboune et al., "Application of liquid chromatography/electrospray ionization tandem mass spectrometry for the elucidation of hydroxyl radical oxidation of metsulfuron methyl and related sulfonylurea pesticide products: evidence for the triazine skeleton scission", Rapid Communications in Mass Spectrometry, vol. 29, Sep. 2015, pp. 1370-1380.
Rafqah et al., "Kinetics and mechanism of the degradation of the pesticde metsulfuron methyl induced by excitation of iron(III) aqua complexes in aqueous solutions: steady state and transient absorption spectroscopy studies", Photochem. Photobial. Sci., vol. 3, 2004, pp. 296-304.
Si et al., "Leaching and degradation of ethametsulfuron-methyl in soil", Cehmosphere, vol. 60, 2005, pp. 601-609.
Li-Feng et al., "Biodegradation of Ethametsulfuron-Methyl by *Pseudomonas* sp. SW4 Isolated from Contaminated Soil", Curr Microbial, vol. 55, 2007, pp. 420-426.
Non-Final Office Action for U.S. Appl. No. 15/839,410 dated Oct. 31, 2019, 41 pages.
Final Office Action for U.S. Appl. No. 15/839,415 dated Nov. 6, 2019, 29 pages.
Advisory Action received for U.S. Appl. No. 15/839,199, dated Nov. 19, 2019, 16 pages.
Non-Final Office Action received for U.S. Appl. No. 15/839,199 dated Dec. 26, 2019, 156 pages.
Haque et al., Synthesis, Characterization, and Crystal Structures of Bis-Imidazolium Salts and Respective Dinuclear Ag(I) N-Heterocyclic Carbene Complexes: in Vitro Anticancer Studies against "Human Colon Cancer" and "Breast cancer", Hindawi Publishing Corporation Journal of Chemistry, 2013, 11 pages.
Wynne et al., "Synthesis and Development of a Multifunctional Self-Decontaminating Polyurethane Coating", Applied Materials and Interfaces, 2011, pp. 2005-2011.
Ol'hovik et al., "Synthesis, Antimicrobial and Antifungal Activity of Double Quaternary Alnmonium Salts of Biphenyls", Russian Journal of General Chemistry, vol. 83, No. 2, 2013, pp. 329-335.
Jones et al., *ortlo Substitution Rearrangement* vs. β)- *Elimination of Quaternary Ammonium Ion-Alcohols and Methyl Ether with Excess Sodium Amide*[1] , vol. 27 ,1962, pp. 806-814.
Menger et al., "Synthesis and Properties of Nine New Polyhydroxylated Surfactants", Langmuir, vol. 12, No. 6, 1996, pp. 1471-1473.
Final Office Action received for U.S. Appl. No. 15/839,397 dated Dec. 16, 2019, 31 pages.
Shen et al., "Synthesis of Highly Ordered Thermally Stable Cubic Mesostructured Zirconium Oxophosphate Templated by Tri-Headgroup Quaternary Ammonium Surfactants", Chem. Mater, 2003, pp. 4046-4051.
Wang et al., "Transfection and structural properties of phytanyl substituted gemini surfactant-based vectors for gene delivery", Phys. Chem. Chem. Phys., 2013, pp. 20510-20516.
Final Office Action received for U.S. Appl. No. 15/839,388 dated Dec. 5, 2019, 43 pages.
List of IBM Patents or Applications Treated as Related.

* cited by examiner

302 — DISSOLVING A PLURALITY OF AMINE MONOMERS WTH AN ELECTROPHILE IN A SOLVENT, THE PLURALITY OF AMINE MONOMERS COMPRISING A DEGRABLE BACKBONE, AND THE DEGRADABLE BACKBONE COMPRISING A TEREPHTHALAMIDE STRUCTURE

304 — POLYMERIZING THE PLURALITY OF AMINE MONOMERS AND THE ELECTROPHILE TO FORM A REPEATING IONENE UNIT, THE REPEATING IONENE UNIT COMPRISING A CATION LOCATED ALONG THE DEGRADABLE BACKBONE, WHEREIN THE REPEATING IONENE UNIT HAS ANTIMICROBIAL FUNCTIONALITY

```
┌─────────────────────────────────────────────────────────┐
│ CONTACTING A PATHOGEN WITH A POLYMER, THE POLYMER       │
│ COMPRISING: A REPEATING IONENE UNIT COMPRISING A        │──1002
│ CATION DISTRIBUTED ALONG A DEGRADABLE BACKBONE, THE     │
│ DEGRADABLE BACKBONE COMPRISING A TEREPHTHALAMIDE        │
│ STRUCTURE, WHEREIN THE REPEATING IONENE HAS             │
│ ANTIMICROBIAL FUNCTIONALITY                             │
└─────────────────────────────────────────────────────────┘
                              │
                              ▼
┌─────────────────────────────────────────────────────────┐
│ ELECTROSTATICALLY DISRUPTING A MEMBRANE OF THE          │──1004
│ PATHOGEN UPON CONTACTING THE PATHOGEN WITH THE          │
│ POLYMER                                                 │
└─────────────────────────────────────────────────────────┘
```

POLYMERS WITH ANTIMICROBIAL FUNCTIONALITIES

BACKGROUND

The subject disclosure relates to one or more polymers with antimicrobial functionalities, and more specifically, to one or more polyionenes comprising cations and/or hydrophobic functional groups distributed along a degradable backbone.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, methods and/or compositions regarding polyionenes with antimicrobial functionality are described.

According to an embodiment, a polymer is provided. The polymer can comprise a repeating ionene unit. The repeating ionene unit can comprise a cation distributed along a degradable backbone. The degradable backbone can comprise a terephthalamide structure. Further, the repeating ionene unit can have antimicrobial functionality.

According to an embodiment, a method is provided. The method can comprise dissolving a plurality of amine monomers with an electrophile in a solvent. The plurality of amine monomers can comprise a degradable backbone, which can comprise a terephthalamide structure. The method can also comprise polymerizing the plurality of amine monomers and the electrophile to form a repeating ionene unit. The repeating ionene unit can comprise a cation located along the degradable backbone. Also, the repeating ionene unit can have antimicrobial functionality.

According to an embodiment, a polyionene composition is provided. The polyionene composition can comprise a repeating ionene unit. The repeating ionene unit can comprise a degradable molecular backbone, which can comprise a terephthalamide structure. The repeating ionene unit can also comprise a cation covalently bonded to the degradable molecular backbone. Further, the repeating ionene unit can have antimicrobial functionality.

According to an embodiment, a method is provided. The method can comprise dissolving a plurality of degradable amine monomers with an electrophile in a solvent. The method can also comprise polymerizing the plurality of degradable amine monomers and the electrophile to form a precipitate. The precipitate can comprise a repeating ionene unit, which can comprise a cation distributed along a degradable molecular backbone. The degradable molecular backbone can comprise a terephthalamide structure. Also, the repeating ionene unit can have antimicrobial functionality.

According to an embodiment, a method is provided. The method can comprise contacting a pathogen with a polymer. The polymer can comprise a repeating ionene unit, which can comprise a cation distributed along a degradable backbone. The degradable backbone can comprise a terephthalamide structure. Also, the repeating ionene unit can have antimicrobial functionality.

BRIEF DESCRIPTION OF THE DRAWINGS

FIG. 3 illustrates a flow diagram of an example, non-limiting method that can facilitate polymerization of one or more repeating ionene units in accordance with one or more embodiments described herein.

FIG. 10 illustrates another flow diagram of an example, non-limiting method regarding one or more repeating ionene units in accordance with one or more embodiments described herein.

DETAILED DESCRIPTION

Figure 1A:
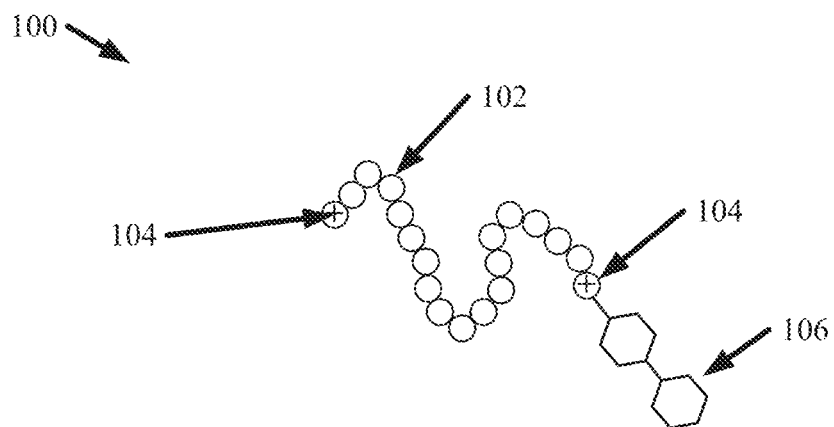
FIG. 1A illustrates a diagram of an example, non-limiting ionene unit in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The discovery and refinement of antibiotics was one of the crowning achievements in the $20^{th}$ century that revolutionized healthcare treatment. For example, antibiotics such as penicillin, ciprofloxacin and, doxycycline can achieve microbial selectivity through targeting and disruption of a specific prokaryotic metabolism, while concurrently, remaining benign toward eukaryotic cells to afford high selectivity. If properly dosed, they could eradicate infection. Unfortunately, this therapeutic specificity of antibiotics also leads to their undoing as under-dosing (incomplete kill)

allows for minor mutative changes that mitigate the effect of the antibiotic leading to resistance development. Consequently, nosocomial infections, caused by medication-resistant microbes such as methicillin-resistant *Staphylococcus aureus* (MRSA), multi-medication-resistant *Pseudomonas aeruginosa* and vancomycin-resistant *Enterococci* (VRE) have become more prevalent. An added complexity is the pervasive use of antimicrobial agents in self-care products, sanitizers and hospital cleaners etc, including anilide, bisphenols, biguanides and quaternary ammonium compounds, where a major concern is the development of cross- and co-resistance with clinically used antibiotics, especially in a hospital setting. Another unfortunate feature with triclosan, for example, is its cumulative and persistent effects in the skin. Moreover, biofilms have been associated with numerous nosocomial infections and implant failure, yet the eradication of biofilms is an unmet challenge to this date. Since antibiotics are not able to penetrate through extracellular polymeric substance that encapsulates bacteria in the biofilm, further complexities exist that lead to the development of medication resistance.

However, polymers having a cationic charge can provide electrostatic disruption of the bacterial membrane interaction. Furthermore, cationic polymers are readily made amphiphilic with addition of hydrophobic regions permitting both membrane association and integration/lysis. The amphiphilic balance has shown to play an important effect not only in the antimicrobial properties but also in the hemolytic activity. Many of these antimicrobial polymers show relatively low selectivity as defined by the relative toxicity to mammalian cells or hemolysis relative to pathogens.

As used herein, the term "ionene" can refer to a polymer unit, a copolymer unit, and/or a monomer unit that can comprise a nitrogen cation and/or a phosphorus cation distributed along, and/or located within, a molecular backbone, thereby providing a positive charge. Example nitrogen cations include, but are not limited to: quaternary ammonium cations, protonated secondary amine cations, protonated tertiary amine cations, and/or imidazolium cations. Example, phosphorus cations include, but are not limited to: quaternary phosphonium cations, protonated secondary phosphine cations, and protonated tertiary phosphine cations. As used herein, the term "molecular backbone" can refer to a central chain of covalently bonded atoms that form the primary structure of a molecule. In various embodiments described herein, side chains can be formed by bonding one or more functional groups to a molecular backbone. As used herein, the term "polyionene" can refer to a polymer that can comprise a plurality of ionenes. For example, a polyionene can comprise a repeating ionene.

FIG. 1A illustrates a diagram of an example, non-limiting ionene unit 100 in accordance with one or more embodiments described herein. The ionene unit 100 can comprise a molecular backbone 102, one or more cations 104, and/or one or more hydrophobic functional groups 106. In various embodiments, an ionene and/or a polyionene described herein can comprise the ionene unit 100. For example, a polyionene described herein can comprise a plurality of ionenes bonded together, wherein the bonded ionenes can have a composition exemplified by ionene unit 100.

Figure 1B:
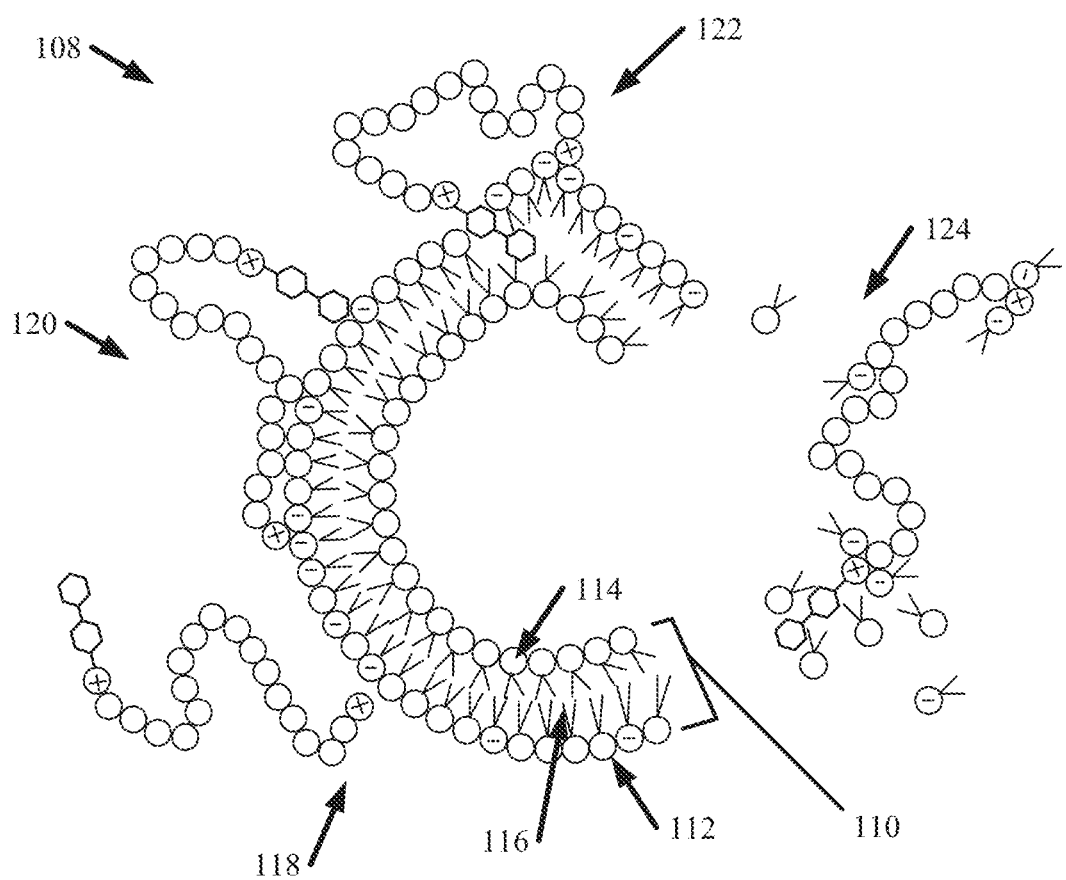
FIG. 1B illustrates a diagram of an example, non-limiting lysis process that can be performed by one or more ionene units in accordance with one or more embodiments described herein.

The molecular backbone 102 can comprise a plurality of covalently bonded atoms (illustrated as circles in FIGS. 1A and 1B). The atoms can be bonded in any desirable formation, including, but not limited to: chain formations, ring formations, and/or a combination thereof. The molecular backbone 102 can comprise one or more chemical structures including, but not limited to: alkyl structures, aryl structures, alkane structures, aldehyde structures, ester structures, carboxyl structures, carbonyl structures, amine structures, amide structures, phosphide structures, phosphine structures, a combination thereof, and/or the like. One of ordinary skill in the art will recognize that the number of atoms that can comprise the molecular backbone can vary depending of the desired function of the ionene unit 100. For example, while nineteen atoms are illustrated in FIG. 1A, a molecular backbone 102 that can comprise dozens, hundreds, and/or thousands of atoms is also envisaged.

Located within the molecular backbone 102 are one or more cations 104. As described above, the one or more cations 104 can comprise nitrogen cations and/or phosphorous cations. The cations 104 can be distributed along the molecular backbone 102, covalently bonded to other atoms within the molecular backbone 102. In various embodiments, the one or more cations 104 can comprise at least a portion of the molecular backbone 102. One of ordinary skill in the art will recognize that the number of a cations 104 that can comprise the ionene unit 100 can vary depending of the desired function of the ionene unit 100. For example, while two cations 104 are illustrated in FIG. 1A, an ionene unit 100 that can comprise dozens, hundreds, and/or thousands of cations 104 is also envisaged. Further, while FIG. 1A illustrates a plurality of cations 104 evenly spaced apart, other configurations wherein the cations 104 are not evenly spaced apart are also envisaged. Also, the one or more cations 104 can be located at respective ends of the molecular backbone 102 and/or at intermediate portions of the molecular backbone 102, between two or more ends of the molecular backbone 102. The one or more cations 104 can provide a positive charge to one or more locations of the ionene unit 100.

The one or more hydrophobic functional groups 106 can be bonded to the molecular backbone 102 to form a side chain. The one or more of the hydrophobic functional groups 106 can be attached to the molecular backbone 102 via bonding with a cation 104. Additionally, one or more hydrophobic functional groups 106 can be bonded to an electrically neutral atom of the molecular backbone 102. The ionene unit 100 can comprise one or more hydrophobic functional groups 106 bonded to: one or more ends of the molecular backbone 102, all ends of the molecular backbone 102, an intermediate portion (e.g., a portion between two ends) of the molecular backbone 102, and/or a combination thereof.

While a biphenyl group is illustrated in FIG. 1A as the hydrophobic functional group 106, other functional groups that are hydrophobic are also envisaged. Example, hydrophobic functional groups 106 can include, but are not limited to: alkyl structures, aryl structures, alkane structures, aldehyde structures, ester structures, carboxyl structures, carbonyl structures, carbonate structures, alcohol structures, a combination thereof, and/or the like. In various embodiments, the one or more hydrophobic functional groups 106 can comprise the same structure. In other embodiments, one or more of the hydrophobic functional groups 106 can comprise a first structure and one or more other hydrophobic functional groups 106 can comprise another structure.

FIG. 1B illustrates a diagram of an example, non-limiting lysis process 108 that can be facilitated by the ionene unit 100 in accordance with one or more embodiments described herein. Repetitive description of like elements employed in other embodiments described herein is omitted for sake of brevity. The lysis process 108 can comprise a plurality of stages, which can collectively comprise an attack mechanism that can be performed by the ionene unit 100 against a pathogen cell. Example pathogen cells can include, but are not limited to: Gram-positive bacteria cells, Gram-negative bacteria cells, fungi cells, and/or yeast cells.

The target pathogen cell can comprise a membrane having a phospholipid bilayer 110. In various embodiments, the membrane can be an extracellular matrix. The phospholipid bilayer 110 can comprise a plurality of membrane molecules 112 covalently bonded together, and the membrane molecules 112 can comprise a hydrophilic head 114 and one or more hydrophobic tails 116. Further, one or more of the plurality of membrane molecules 112 can be negatively charged (as illustrated in FIG. 1B with a "−" symbol).

At 118, electrostatic interaction can occur between the positively charged cations 104 of the ionene unit 100 and one or more negatively charged membrane molecules 112. For example, the negative charge of one or more membrane molecules 112 can attract the ionene unit 100 towards the membrane (e.g., the phospholipid bilayer 110). Also, the electrostatic interaction can electrostatically disrupt the integrity of the membrane (e.g., phospholipid bilayer 110). Once the ionene unit 100 has been attracted to the membrane (e.g., phospholipid bilayer 110), hydrophobic membrane integration can occur at 120. For example, at 120 one or more hydrophobic functional groups 106 of the ionene unit 100 can begin to integrate themselves into the phospholipid bilayer 110. While the positively charged portions of the ionene unit 100 are attracted, and electrostatically disrupting, one or more negatively charged membrane molecules 112 (e.g., one or more hydrophilic heads 114), the one or more hydrophobic functional groups 106 can insert themselves between the hydrophilic heads 114 to enter a hydrophobic region created by the plurality of hydrophobic tails 116.

As a result of the mechanisms occurring at 118 and/or 120, destabilization of the membrane (e.g., the phospholipid bilayer 110) can occur at 122. For example, the one or more hydrophobic functional groups 106 can serve to cleave one or more negatively charged membrane molecules 112 from adjacent membrane molecules 112, and the positively charged ionene unit 100 can move the cleaved membrane segment (e.g., that can comprise one or more negatively charged membrane molecules 112 and/or one or more neutral membrane molecules 112 constituting a layer of the phospholipid bilayer 110) away from adjacent segments of the membrane (e.g., adjacent segments of the phospholipid bilayer 110). As cleaved segments of the membrane (e.g., the phospholipid bilayer 110) are pulled away, they can fully detach from other membrane molecules 112 at 124, thereby forming gaps in the membrane (e.g., the phospholipid bilayer 110). The formed gaps can contribute to lysis of the subject pathogen cell. In various embodiments, a plurality of ionene units 100 can perform the lysis process 108 on a cell simultaneously. Furthermore, the ionene units 100 participating in a lysis process 108 need not perform the same stages of the attack mechanism at the same time.

Figure 2:
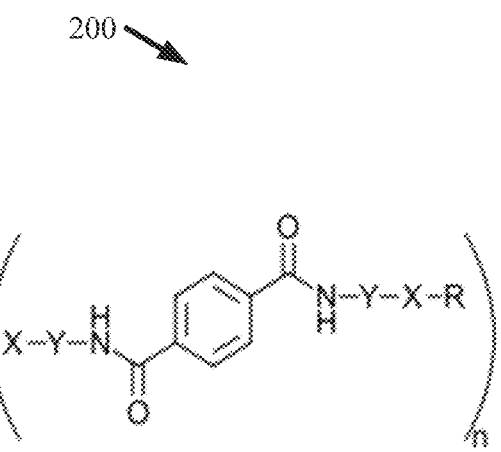
FIG. 2 illustrates a diagram of an example, non-limiting chemical formula that can characterize one or more repeating ionene units in accordance with one or more embodiments described herein.

FIG. 2 illustrates a diagram of an example, non-limiting chemical formula 200 that can characterize the structure of a repeating ionene unit 100 in accordance with one or more embodiments described herein. Repetitive description of like elements employed in other embodiments described herein is omitted for sake of brevity. In various embodiments, the repeating ionene units 100 characterized by chemical formula 200 can be covalently bonded together to form a polymer (e.g., a polyionene composition).

As shown in FIG. 2, a repeating ionene unit 100 characterized by chemical formula 200 can comprise a degradable molecular backbone 102. Further, the degradable molecular backbone 102 can comprise one or more terephthalamide structures. In various embodiments, the repeating ionene unit 100 characterized by chemical formula 200 can be derived from polyethylene terephthalate (PET), wherein the one or more terephthalamide structures can be derived from the PET. However, one or more embodiments of chemical formula 200 can comprise a terephthalamide structure derived from one or more molecules other than PET.

The "X" in FIG. 2 can represent the one or more cations 104. For example, "X" can represent one or more cations 104 selected from a group that can include, but is not limited to: one or more nitrogen cations, one or more phosphorus cations, and/or a combination thereof. For instance, "X" can represent one or more nitrogen cations selected from a group that can include, but is not limited to: one or more protonated secondary amine cations, one or more protonated tertiary amine cations, one or more quaternary ammonium cations, one or more imidazolium cations, and/or a combination thereof. In another instance, "X" can represent one or more phosphorus cations selected from a group that can include, but is not limited to: one or more protonated secondary phosphine cations, one or more protonated tertiary phosphine cations, one or more quaternary phosphonium cations, and/or a combination thereof.

The one or more cations 104 (e.g., represented by "X" in chemical formula 200) can be covalently bonded to one or more linkage groups to form, at least a portion, of the degradable molecular backbone 102. The one or more linkage groups can link the one or more cations 104 to the one or more terephthalamide structures, thereby comprising the molecular backbone 102. The "Y" in FIG. 2 can represent the one or more linkage groups. The one or more linkage groups can comprise any structure in compliance with the various features of the molecular backbone 102 described herein. For example, the one or more linkage groups can have any desirable formation, including, but not limited to: chain formations, ring formations, and/or a combination thereof. The one or more linkage groups can comprise one or more chemical structures including, but not limited to: alkyl structures, aryl structures, alkane structures, aldehyde structures, ester structures, carboxyl structures, carbonyl structures, a combination thereof, and/or the like. For instance, "Y" can represent one or more linkage groups that can comprise an alkyl chain having greater than or equal to two carbon atoms and less than or equal to 15 carbon atoms.

As shown in FIG. 2, in various embodiments, a repeating ionene unit 100 characterized by chemical formula 200 can comprise cations 104 (e.g., represented by "X") at a plurality of locations along the molecular backbone 102. For example, cations 104 can be located at either end of the molecular backbone 102 (e.g., as illustrated in FIG. 2). However, in one or more embodiments of chemical formula 200, the molecular backbone 102 can comprise less or more cations 104 than the two illustrated in FIG. 2.

Further, the "R" shown in FIG. 2 can represent the one or more hydrophobic functional groups 106 in accordance with the various embodiments described herein. For example, the one or more hydrophobic functional groups 106 can comprise one or more alkyl groups and/or one or more aryl groups. For instance, the hydrophobic functional group 106 can be derived from a dialkyl halide. The one or more hydrophobic functional groups 106 (e.g., represented by "R" in FIG. 2) can be covalently bonded to one or more of the cations 104 (e.g., represented by "X" in FIG. 2) and/or the molecular backbone 102, which can comprise the one or more cations 104 (e.g., represented by "X" in FIG. 2), one or more linkage groups (e.g., represented by "Y" in FIG. 2), and/or one or more terephthalamide structures. In addition, the "n" shown in FIG. 2 can represent an integer greater than or equal to two and less than or equal to one thousand.

FIG. 3 illustrates a flow diagram of an example, non-limiting method 300 that can facilitate generating one or more repeating ionene units 100 that can be characterized by chemical formula 200. Repetitive description of like elements employed in other embodiments described herein is omitted for sake of brevity.

At 302, the method 300 can comprise dissolving a plurality of amine monomers with one or more electrophiles in a solvent. The plurality of amine monomers can comprise a degradable backbone. Further, the degradable backbone can comprise one or more terephthalamide structures. Additionally, the plurality of amine monomers can further comprise a structure selected from a group that can include, but is not limited to: alkyl amine groups, hetero cyclic amine groups, a combination thereof, and/or the like. Moreover, in one or more embodiments the plurality of degradable amine monomers can be degradable tetra-amine monomers.

The one or more electrophiles can comprise, for example, one or more alkyl halides (e.g., dialkyl halides). For instance, the one or more electrophiles can comprise one or more dialkyl halides having chloride and/or bromide. Example electrophiles can include, but are not are not limited to: p-xylylene dichloride, 4,4'-bis(chloromethyl)biphenyl, 1,4-bis(bromomethyl)benzene, 4,4'-bis(bromomethyl)biphenyl, a combination thereof, and/or the like. The solvent can be an organic solvent. Example solvents can include but are not limited to: dimethyl formamide ("DMF"), 1,8-diazabicyclo[5.4.0]undec-7-ene ("DBU"), 1-(3,5-bis(trifluoromethyl)-phenyl)-3-cyclohexyl-2-thiourea ("TU"), and/or a combination thereof, and/or the like.

At 304, the method 300 can comprise polymerizing the plurality of amine monomers and the one or more electrophiles to form a repeating ionene unit (e.g., ionene unit 100). The repeating ionene unit (e.g., ionene unit 100) can comprise a cation 104 (e.g., a nitrogen cation and/or a phosphorus cation) located along the degradable backbone (e.g., a molecular backbone 102). Further, the repeating ionene unit 100 can have antimicrobial functionality.

During the polymerization at 304, a nitrogen atom and/or a phosphorus atom located in the degradable backbone can be subject to alkylation and/or quaternization; thus, the polymerization at 304 can conduct a polymer-forming reaction (e.g., formation of the repeating ionene unit 100) and an installation of charge (e.g., forming a cation 104, including a nitrogen cation and/or a phosphorus cation) simultaneously without a need of a catalyst. Further, one or more hydrophobic functional groups 106 can be derived from the one or more electrophiles and/or can be bonded to the one or more cations 104 as a result of the alkylation and/or quaternization process.

The repeating ionene unit formed at 304 can comprise one or more embodiments of the ionene unit 100 and can be characterized by one or more embodiments of chemical formula 200. For instance, the repeating ionene unit 100 formed at 304 can comprise a degradable molecular backbone 102 that can comprise one or more cations 104 (e.g., represented by "X" in chemical formula 200), one or more linkage groups (e.g., represented by "Y" in chemical formula 200), a terephthalamide structure (e.g., as shown in FIG. 2), and/or one or more hydrophobic functional groups 106 (e.g., represented by "R" in chemical formula 200). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the terephthalamide structure via one or more linkage groups (e.g., alkyl groups and/or aryl groups). Further, one or more of the cations 104 can be bonded to one or more of the hydrophobic functional groups 106. Additionally, the repeating ionene unit 100 formed at 304 can repeat a number of times greater than or equal to 2 and less than or equal to 1000.

Figure 4:
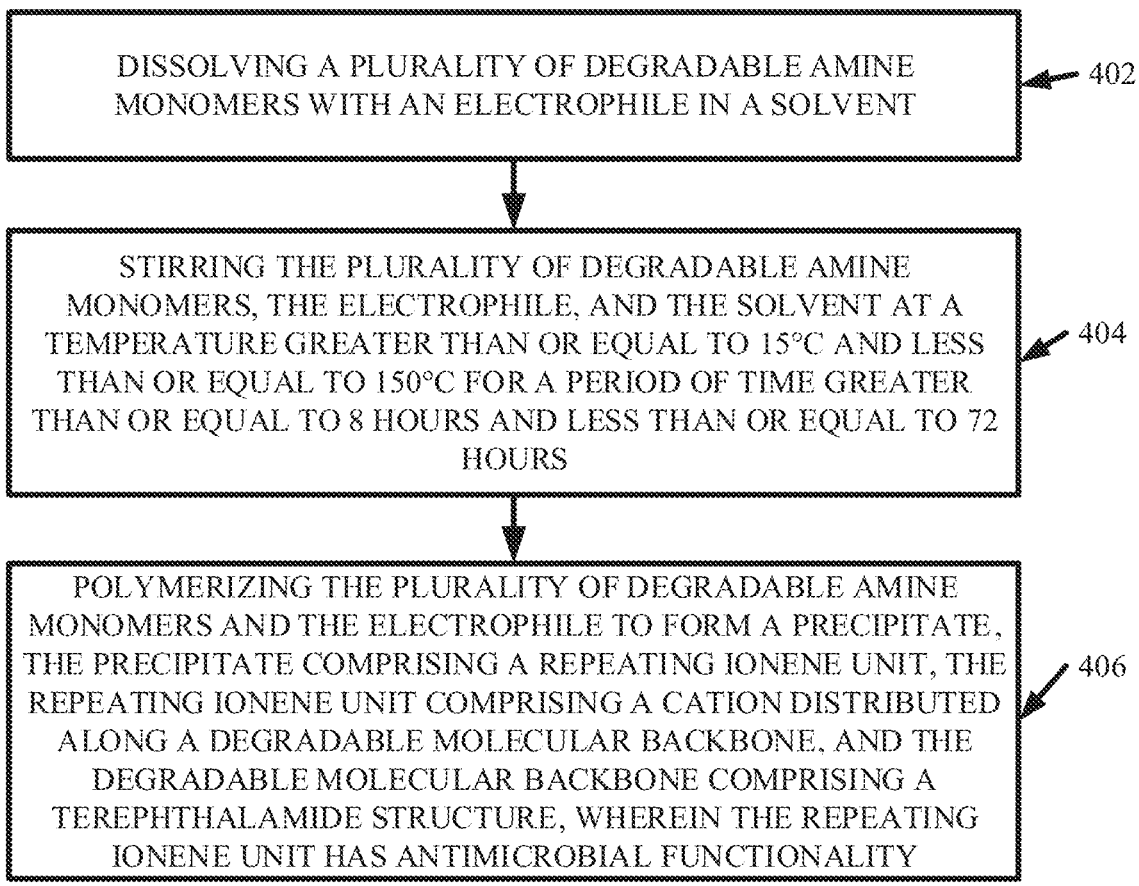
FIG. 4 illustrates another flow diagram of an example, non-limiting method that can facilitate polymerization of one or more repeating ionene units in accordance with one or more embodiments described herein.

FIG. 4 illustrates another flow diagram of an example, non-limiting method 400 that can be practiced in accordance with the one or more embodiments of method 300 and can generate repeating ionene units 100, which can be characterized by chemical formula 200. Repetitive description of like elements employed in other embodiments described herein is omitted for sake of brevity.

At 402, the method 400 can comprise dissolving a plurality of degradable amine monomers with one or more electrophiles in a solvent. As described above regarding method 300, the plurality of degradable amine monomers can further comprise a structure selected from a group that can include, but is not limited to: alkyl amine groups, hetero cyclic amine groups, a combination thereof, and/or the like. Moreover, in one or more embodiments the plurality of degradable amine monomers can be degradable tetra-amine monomers.

The one or more electrophiles can comprise, for example, one or more alkyl halides (e.g., dialkyl halides). For instance, the one or more electrophiles can comprise one or more dialkyl halides having chloride and/or bromide. Example electrophiles can include, but are not are not limited to: p-xylylene dichloride, 4,4'-bis(chloromethyl)biphenyl, 1,4-bis(bromomethyl)benzene, 4,4'-bis(bromomethyl)biphenyl, a combination thereof, and/or the like.

The solvent can be an organic solvent. Example solvents can include but are not limited to: DMF, DBU, TU, and/or a combination thereof, and/or the like. For example, DMF can be used as the solvent as it can dissolve the reactants at elevated temperatures. In one or more embodiments, equimolar amounts of the plurality of degradable amine monomers and the one or more electrophiles can be dissolved in the solvent.

In one or more embodiments, the plurality of degradable amine monomers can be prepared through an aminolysis of PET. For example, PET can be depolymerized with one or more aminolysis reagents. The one or more aminolysis reagents can be diamines. A first amino group of the diamines can include, but are not limited to, a primary amino group and a secondary amino group. Also, a second amino group of the diamines can include, but are not limited to: a primary amino group, a secondary amino group, a tertiary amino group, and/or an imidazole group. For example, in one or more embodiments the secondary amino group is a tertiary amino group and/or an imidazole group.

Scheme 1, presented below, demonstrates three exemplary, non-liming degradable amine monomers that can be prepared through aminolysis of PET.

Scheme 1

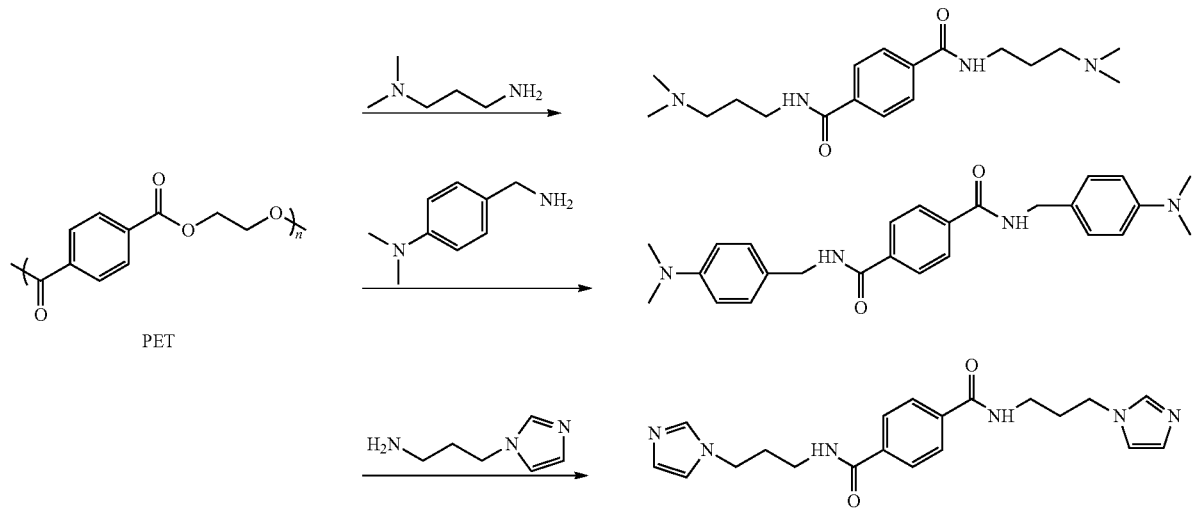

Preparation of the plurality of degradable amine monomers (e.g., in accordance with Scheme 1) can be performed without the need of a catalyst and/or a solvent. Further, aminolysis of PET can be performed with an excess of the aminolysis reagents (e.g., four times excess of the aminolysis reagents). Moreover, the aminolysis can depolymerize PET at elevated temperatures. Upon cooling, the target degradable amine monomers can be crystallized from the excess reagent and an alcohol side product (e.g., ethylene glycol). The degradable amine monomers can then be filtered, rinsed (e.g., with ethylacetate), and used without need for further purification.

While Scheme 1 depicts three example degradable amine monomers derived from PET, other degradable amine monomers that can be derived from PET are also envisaged. For example, PET can be depolymerized with aminolysis reagents other than the three depicted in Scheme 1. For instance, any aminolysis reagent having a primary amino group and/or a secondary amino group, which can donate a hydrogen atom to facilitate bonding to the terephthalate structure, and a second amino group and/or imidazole group, which can later become a cation 104, can be polymerized with PET to prepare a degradable amine monomer for use at 402. Further, the prepared degradable amine monomers derived from PET, as described herein, can comprise the plurality of amine monomers that can be utilized in method 300.

Additionally, in one or more embodiments the plurality of degradable amine monomers utilized in conjunction with the methods described herein (e.g., method 300 and/or method 400) can be derived from a molecule other than PET. One of ordinary skill in the art can readily recognize that a plethora of other starting molecules can be polymerized and/or depolymerized to prepare the plurality of amine monomers (e.g., which can have degradable backbones, can comprise a terephthalamide structure, and/or can be a tetra-amine) that can be utilized in conjunction with the methods described herein (e.g., method 300 and/or method 400).

At 404, the method 400 can optionally comprise stirring the plurality of degradable amine monomers, the one or more electrophiles, and the solvent at a temperature greater than or equal to 15 degrees Celsius (° C.) and less than or equal to 150° C. for a period of time greater than or equal to 8 hours and less than or equal to 72 hours (e.g., greater than or equal to 12 hours and less than or equal to 24 hours).

At 406, the method 400 can comprise polymerizing the plurality of degradable amine monomers and the electrophile to form a precipitate (e.g., a polyionene composition). The precipitate (e.g., a polyionene composition) can comprise a repeating ionene unit 100 (e.g., characterized by chemical formula 200) that can comprise a cation 104 distributed along a degradable molecular backbone 102. The molecular backbone 102 can comprise a terephthalamide structure (e.g., as illustrated in chemical formula 200). Further, the repeating ionene unit 100 formed at 406 can have antimicrobial functionality. In one or more embodiments, the polymerizing at 406 can be performed under nitrogen gas. Additionally, the polymerizing at 406 can generate the cation through alkylation and/or quaternation with the one or more electrophiles. In various embodiments, the terephthalamide structure comprising the precipitate can be derived from the PET that was depolymerized to prepare a plurality of degradable amine monomers.

During the polymerization at 406, a nitrogen atom and/or a phosphorus atom located in the degradable amine monomers can be subject to alkylation and/or quaternization; thus, the polymerization at 406 can conduct a polymer-forming reaction (e.g., formation of the repeating ionene unit 100) and an installation of charge (e.g., forming a cation 104, including a nitrogen cation and/or a phosphorus cation) simultaneously without a need of a catalyst. Further, one or more hydrophobic functional groups 106 can be derived from the one or more electrophiles and/or can be bonded to the one or more cations 104 as a result of the alkylation and/or quaternization process.

For example, the repeating ionene formed at 406 can comprise one or more embodiments of the ionene unit 100 and can be characterized by one or more embodiments of chemical formula 200. For instance, the repeating ionene unit 100 formed at 406 can comprise a degradable molecular backbone 102 that can comprise one or more cations 104 (e.g., represented by "X" in chemical formula 200), one or more linkage groups (e.g., represented by "Y" in chemical formula 200), a terephthalamide structure (e.g., as shown in FIG. 2), and/or one or more hydrophobic functional groups 106 (e.g., represented by "R" in chemical formula 200). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the terephthalamide structure via one or more linkage groups (e.g., alkyl groups and/or aryl groups). Further, one or more of the cations 104 can be bonded to one or more of the hydrophobic functional groups 106. Additionally, the repeating ionene unit 100 formed at 406 can repeat a number of times greater than or equal to 2 and less than or equal to 1000.

Antimicrobial activity of the repeating ionene units 100 generated by the methods described herein (e.g., method 300 and/or method 400) can be independent of molecular weight. Thus, the methods (e.g., method 300 and/or method 400) can target polymerization conditions that can extinguish molecular weight attainment by diffusion limited mechanism (e.g., polymer precipitation) to modest molecular weights (e.g., molecular weights less than 10,000 grams per mole (g/mol)), which can aid in the solubility of the repeating ionene units 100 in aqueous media.

Figure 5:
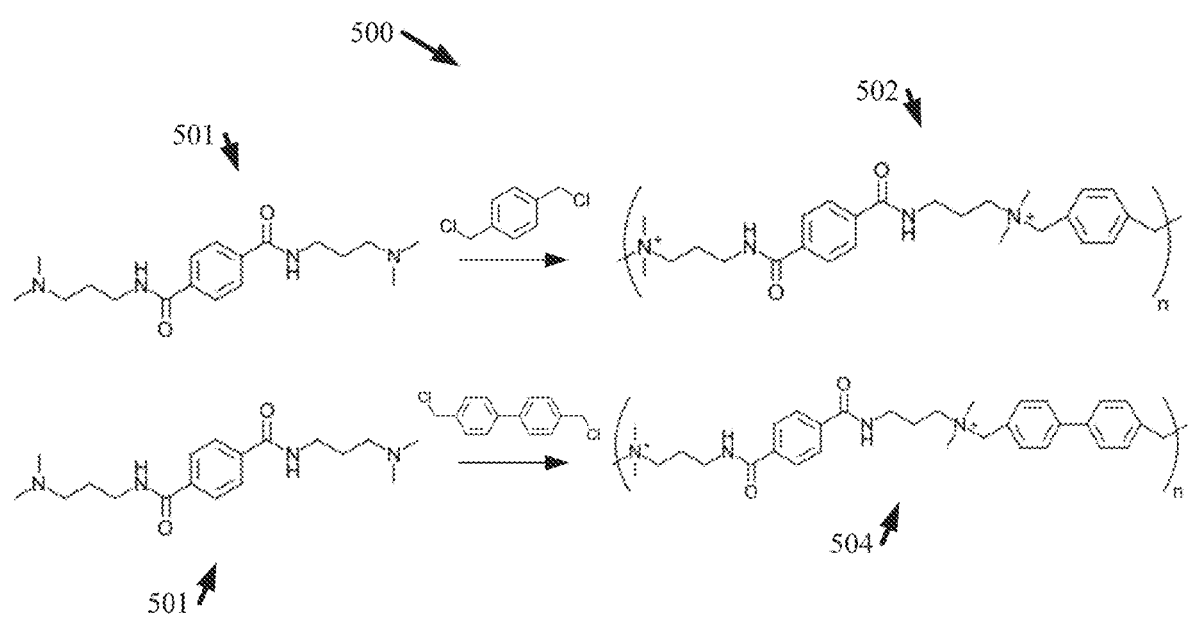
FIG. 5 illustrates a diagram of an example, non-limiting scheme that can depict a plurality of polyionene compositions in accordance with one or more embodiments described herein.

FIG. 5 illustrates a diagram of an example, non-limiting scheme 500 that can depict the polymerization of one or more repeating ionene units 100 (e.g., characterized by chemical formula 200) in accordance with one or more of the methods (e.g., method 300 and/or method 400) described herein. Repetitive description of like elements employed in other embodiments described herein is omitted for sake of brevity. For example, scheme 500 can depict a first polymerization that can form a first polyionene composition 502 (e.g., a repeating ionene unit 100 that can be characterized by chemical formula 200 and/or generated by method 300 and/or method 400). Scheme 500 can also depict a second polymerization that can form a second polyionene composition 504 (e.g., a repeating ionene unit 100 that can be characterized by chemical formula 200 and/or generated by method 300 and/or method 400). In scheme 500, "n" can represent an integer greater than or equal to two and less than or equal to one thousand. Additionally, the first monomer reactant 501 utilized in the first polymerization and the second polymerization can be a degradable tetra-amine monomer comprising a terephthalamide structure that can be derived from PET in accordance with the various embodiments described herein (e.g., Scheme 1). In one or more other embodiments, the amine monomer reactant 501 can be derived from a molecule other than PET.

The first polymerization can form the first polyionene composition 502 by polymerizing the first monomer reactant 501 (e.g., derived from aminolysis of PET) with p-xylylene dichloride. The first polymerization can simultaneously form the structure of the first polyionene composition 502 and positively charge the first polyionene composition 502 (e.g., by generating the plurality of quaternary ammonium cations) through quaternization of the first monomer reactant's 501 tertiary amino groups distributed along the first monomer reactant's 501 degradable backbone (e.g., molecular backbone 102).

The second polymerization can form the second polyionene composition 504 by polymerizing the first monomer reactant 501 (e.g., derived from aminolysis of PET) with 4,4'-bis(chloromethyl)-1,1'-biphenyl. The second polymerization can simultaneously form the structure of the second polyionene composition 504 and positively charge the second polyionene composition 504 (e.g., by generating the plurality of quaternary ammonium cations) through quaternization of the first monomer reactant's 501 tertiary amino groups distributed along the first monomer reactant's 501 degradable backbone (e.g., molecular backbone 102).

Figure 6:
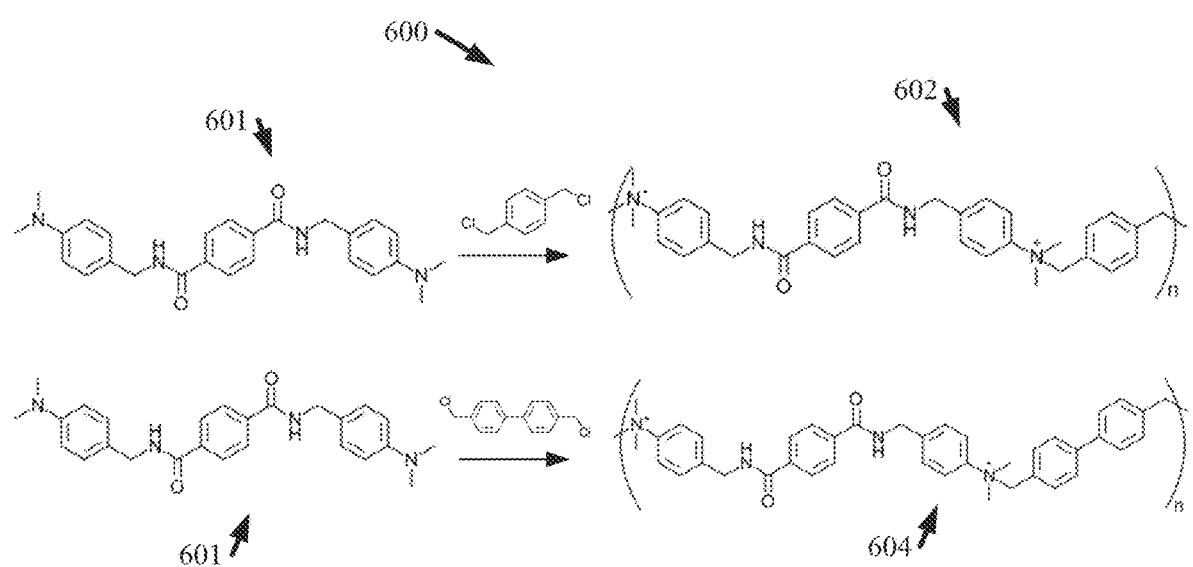
FIG. 6 illustrates another diagram of an example, non-limiting scheme that can depict a plurality of polyionene compositions in accordance with one or more embodiments described herein.

FIG. 6 illustrates another diagram of an example, non-limiting scheme 600 that can depict the polymerization of one or more repeating ionene units 100 (e.g., characterized by chemical formula 200) in accordance with one or more of the methods (e.g., method 300 and/or method 400) described herein. Repetitive description of like elements employed in other embodiments described herein is omitted for sake of brevity. For example, scheme 600 can depict a third polymerization that can form a third polyionene composition 602 (e.g., a repeating ionene unit 100 that can be characterized by chemical formula 200 and/or generated by method 300 and/or method 400). Scheme 600 can also depict a fourth polymerization that can form a fourth polyionene composition 604 (e.g., a repeating ionene unit 100 that can be characterized by chemical formula 200 and/or generated by method 300 and/or method 400). In scheme 600, "n" can represent an integer greater than or equal to two and less than or equal to one thousand. Additionally, the second monomer reactant 601 utilized in the third polymerization and the fourth polymerization can be a degradable tetra-amine monomer comprising a terephthalamide structure that can be derived from PET in accordance with the various embodiments described herein (e.g., Scheme 1).

The third polymerization can form the third polyionene composition 602 by polymerizing the second monomer reactant 601 (e.g., derived from aminolysis of PET) with p-xylylene dichloride. The third polymerization can simultaneously form the structure of the third polyionene composition 602 and positively charge the third polyionene composition 602 (e.g., by generating the plurality of quaternary ammonium cations) through quaternization of the second monomer reactant's 601 tertiary amino groups distributed along the second monomer reactant's 601 degradable backbone (e.g., molecular backbone 102).

The fourth polymerization can form the fourth polyionene composition 604 by polymerizing the second monomer reactant 601 (e.g., derived from aminolysis of PET) with 4,4'-bis(chloromethyl)-1,1'-biphenyl. The fourth polymerization can simultaneously form the structure of the fourth polyionene composition 604 and positively charge the fourth polyionene composition 604 (e.g., by generating the plurality of quaternary ammonium cations) through quaternization of the second monomer reactant's 601 tertiary amino groups distributed along the second monomer reactant's 601 degradable backbone (e.g., molecular backbone 102).

Figure 7:
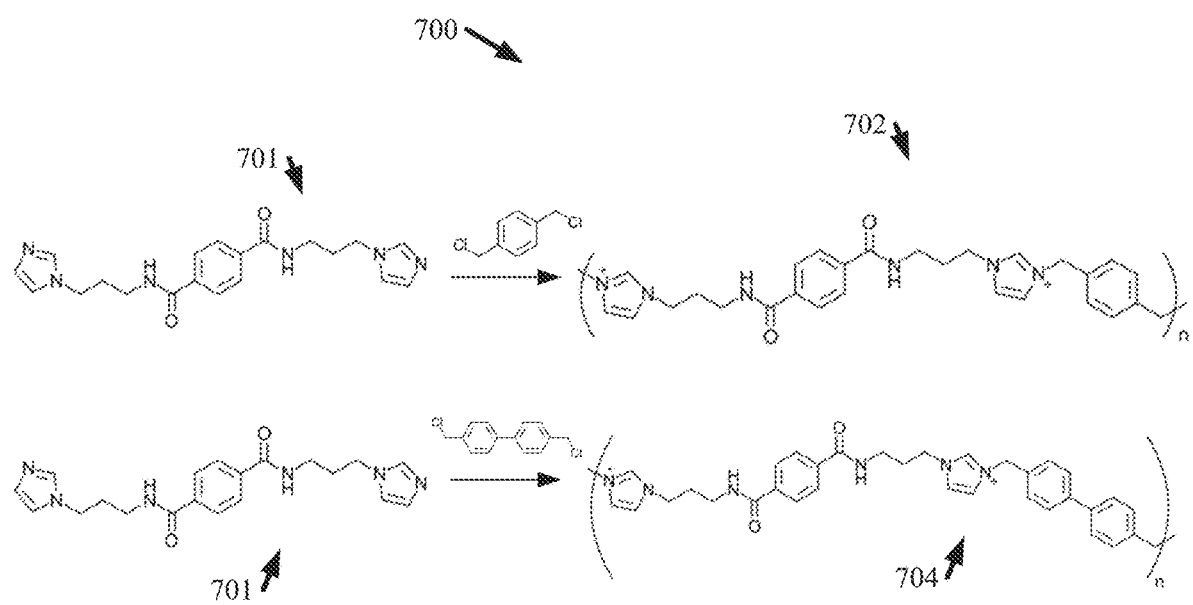
FIG. 7 illustrates another diagram of an example, non-limiting scheme that can depict a plurality of polyionene compositions in accordance with one or more embodiments described herein.

FIG. 7 illustrates another diagram of an example, non-limiting scheme 700 that can depict the polymerization of one or more repeating ionene units 100 (e.g., characterized by chemical formula 200) in accordance with one or more of the methods (e.g., method 300 and/or method 400) described herein. Repetitive description of like elements employed in other embodiments described herein is omitted for sake of brevity. For example, scheme 700 can depict a fifth polymerization that can form a fifth polyionene composition 702 (e.g., a repeating ionene unit 100 that can be characterized by chemical formula 200 and/or generated by method 300 and/or method 400). Scheme 700 can also depict a sixth polymerization that can form a sixth polyionene composition 704 (e.g., a repeating ionene unit 100 that can be characterized by chemical formula 200 and/or generated by method 300 and/or method 400). In scheme 700, "n" can represent an integer greater than or equal to two and less than or equal to one thousand. Additionally, the third monomer reactant 701 utilized in the third polymerization and the fourth polymerization can be a degradable tetra-amine monomer comprising a terephthalamide structure that can be derived from PET in accordance with the various embodiments described herein (e.g., Scheme 1).

The fifth polymerization can form the fifth polyionene composition 702 by polymerizing the third monomer reactant 701 (e.g., derived from aminolysis of PET) with p-xylylene dichloride. The fifth polymerization can simultaneously form the structure of the fifth polyionene composition 702 and positively charge the fifth polyionene composition 702 (e.g., by generating the plurality of imidazolium cations) through alkylation of the third monomer reactant's 701 imidazole rings distributed along the third monomer reactant's 701 degradable backbone (e.g., molecular backbone 102).

The sixth polymerization can form the sixth polyionene composition 704 by polymerizing the third monomer reactant 701 (e.g., derived from aminolysis of PET) with 4,4'-bis(chloromethyl)-1,1'-biphenyl. The sixth polymerization can simultaneously form the structure of the sixth polyionene composition 704 and positively charge the sixth polyionene composition 704 (e.g., by generating the plurality of imidazolium cations) through alkylation of the third monomer reactant's 701 imidazole rings distributed along the third monomer reactant's 701 degradable backbone (e.g., molecular backbone 102).

Figure 8:
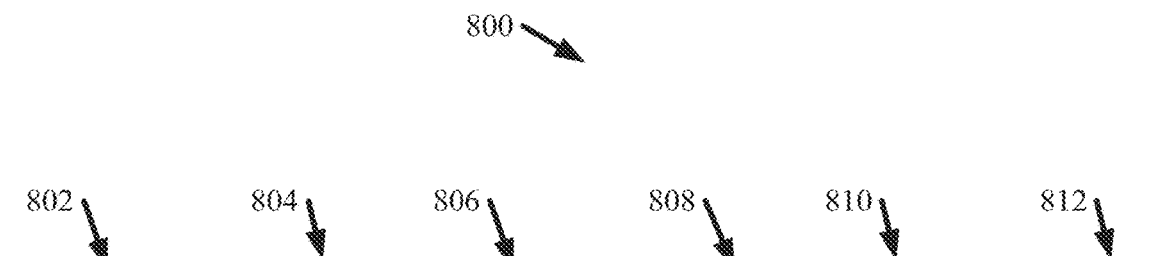
FIG. 8 illustrates a diagram of an example, non-limiting chart that can depict the antimicrobial functionality of one or more polyionene compositions in accordance with one or more embodiments described herein.

FIG. 8 illustrates a diagram of an example, non-limiting chart 800 that can depict the antimicrobial efficacy of one or more polyionene compositions in accordance with one or more embodiments described herein. Repetitive description of like elements employed in other embodiments described herein is omitted for sake of brevity. To demonstrate the antimicrobial effects of the polyionenes described herein (e.g., repeating ionene units 100 that can be characterized by chemical formula 200 and/or generated by method 300 and/or method 400, such as those depicted in scheme 500, scheme 600, and/or scheme 700), a plurality of polyionene compositions were evaluated against a broad spectrum of pathogens.

The first column 802 of chart 800 can depict the polyionene composition subject to evaluation. The second column 804 of chart 800 can depict the minimum inhibitory concentration (MIC) in micrograms per milliliter (μg/mL) of the subject polyionene composition regarding *Staphylococcus aureus* ("SA"). The third column 806 of chart 800 can depict the MIC in μg/mL of the subject polyionene composition regarding *Escherichia coli* ("EC"). The fourth column 808 of chart 800 can depict the MIC in μg/mL of the subject polyionene composition regarding *Pseudomonas aeruginosa* ("PA"). The fifth column 810 of chart 800 can depict the MIC in μg/mL of the subject polyionene composition regarding *Candida albicans* ("CA"). The sixth column 812 of chart 800 can depict the hemolytic activity ("$HC_{50}$") in μg/mL of the subject polyionene composition regarding rat red blood cells.

As shown in chart 800, the first polyionene composition 502 and the second polyionene composition 504 can have strong antimicrobial activity with the former being more potent (e.g., having lower MIC). The second polyionene composition 504 can be relatively more hydrophobic than the first polyionene composition 502, and thus it may interact with one or more proteins in the culture medium used to evaluate the polyionene compositions. Both the first polyionene composition 502 and the second polyionene composition 504 can cause negligible hemolysis of rat red blood cells at the effective concentrations with the polymer concentration that leads to lysis of 50% of rat red blood cells ($HC_{50}$) above 2000 μg/mL. Compared to the first polyionene composition 502 and the second polyionene composition 504, the use of imidazolium in the fifth polyionene composition 702 and the sixth polyionene composition 704 can offer similar antimicrobial potency (e.g., similar MIC ranges). However, the fifth polyionene composition 702 and the sixth polyionene composition 704 can cause higher toxicity to mammalian cells (e.g., reflected by lower $HC_{50}$ values).

Figure 9:
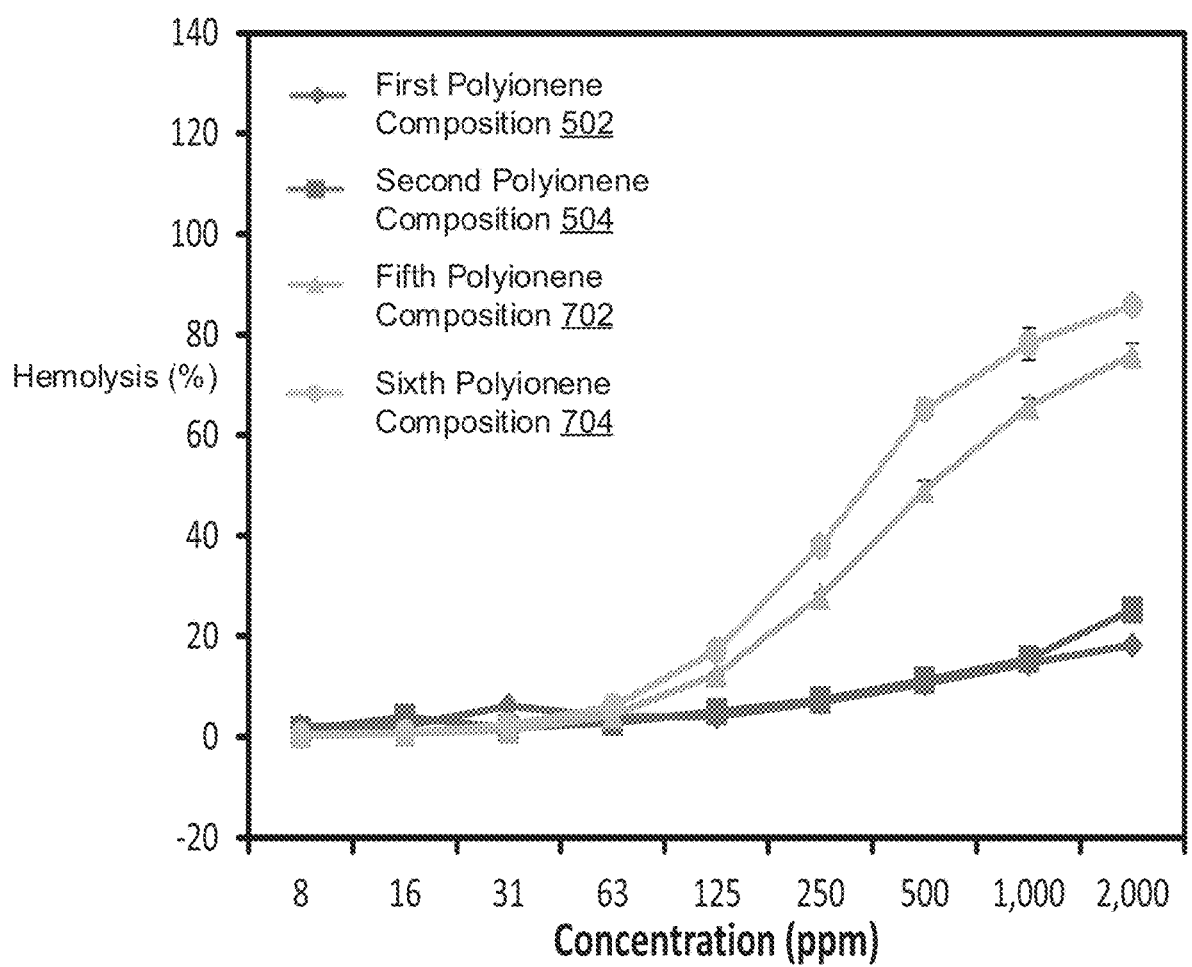
FIG. 9 illustrates a diagram of an example, non-limiting graph that can depict the hemolytic activity of one or more polyionene compositions in accordance with one or more embodiments described herein.

FIG. 9 illustrates a diagram of an example, non-limiting graph 900 that can depict the hemolytic activity of various polyionene compositions at various concentrations in accordance with the one or more embodiments described herein. Repetitive description of like elements employed in other embodiments described herein is omitted for sake of brevity. For example, FIG. 9 shows the hemolytic activity of the first polyionene composition 502, the second polyionene composition 504, the fifth polyionene composition 702, and/or the sixth polyionene composition 704 at concentrations ranging from 8 parts per million (ppm) to 2000 ppm. The hemolytic activity depicted in graph 900 can regard rat red blood cells.

FIG. 10 illustrates another flow diagram of an example, non-limiting method 1000 of killing a pathogen, preventing the growth of a pathogen, and/or preventing contamination by a pathogen. Repetitive description of like elements employed in other embodiments described herein is omitted for sake of brevity. Example pathogens include, but are not limited to: Gram-negative bacteria, Gram-positive bacteria, fungi, yeast, a combination thereof, and/or the like.

At 1002, the method 1000 can comprise contacting the pathogen with a polymer. The polymer can comprise a repeating ionene unit 100 (e.g., characterized by chemical formula 200). The repeating ionene unit 100 can comprise a cation 104 (e.g., a nitrogen cation and/or a phosphorus cation) distributed along a degradable backbone (e.g., a molecular backbone 102) that can comprise one or more terephthalamide structures (e.g., derived from an aminolysis of PET). The repeating ionene unit 100 can have antimicrobial functionality.

At 1004, the method 1000 can comprise electrostatically disrupting a membrane of the pathogen (e.g., via lysis process 108) upon contacting the pathogen with the polymer (e.g., a repeating ionene unit 100 characterized by chemical formula 200). Additionally, contacting the pathogen with the polymer (e.g., a repeating ionene unit 100 characterized by chemical formula 200) can disrupt the membrane through hydrophobic membrane integration (e.g., via lysis process 108).

The repeating ionene unit that can comprise the polymer contacting the pathogen at 1002 can comprise one or more embodiments of the ionene unit 100 and can be characterized by one or more embodiments of chemical formula 200. For instance, the repeating ionene unit 100 can comprise a degradable molecular backbone 102 that can comprise one or more cations 104 (e.g., represented by "X" in chemical formula 200), one or more linkage groups (e.g., represented by "Y" in chemical formula 200), a terephthalamide structure (e.g., as shown in FIG. 2), and/or one or more hydrophobic functional groups 106 (e.g., represented by "R" in chemical formula 200). The one or more cations 104 can be nitrogen cations (e.g., quaternary ammonium cations, imidazolium cations, and/or a combination thereof) and/or phosphorus cations (e.g., quaternary phosphonium cations). The cations 104 can be linked to the terephthalamide structure via one or more linkage groups (e.g., alkyl groups and/or aryl groups). Further, one or more of the cations 104 can be bonded to one or more of the hydrophobic functional groups 106. Additionally, the repeating ionene unit 100 can repeat a number of times greater than or equal to 2 and less than or equal to 1000. Therefore, the repeating ionene unit 100 contacting the pathogen at 1002 can comprise any and all the features of various embodiments described herein.

The various structures (e.g., described regarding FIGS. 1-2), compositions (e.g., described regarding FIGS. 5-9), and/or methods (e.g., described regarding FIGS. 3-4 and 10) described herein can be incorporated into a variety of applications. For example, said applications can include cleaning, sanitizing, disinfecting, and/or otherwise treating various articles such as, but not limited to: food packaging, medical devices, floor surfaces, furniture surfaces, wound care instruments (e.g., bandages and/or gauss), building surfaces, plants (e.g., agricultural crops), ground surfaces, farming equipment, beds, sheets, clothes, blankets, shoes, doors, door frames, walls, ceilings, mattresses, light fixtures, facets, switches, sinks, grab rails, remote controls, vanities, computer equipment, carts, trolleys, hampers, bins, a combination thereof, and/or the like. In another example, said applications can include pharmaceuticals, pharmaceutical salts, hygiene products (e.g., soaps and/or shampoos), and/or the like. In a further example, said applications can include agricultural sprays and/or aqueous solutions that can facilitate processing crops for consumption.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

What has been described above include mere examples of systems, compositions, and methods. It is, of course, not possible to describe every conceivable combination of reagents, products, solvents, and/or articles for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A polymer comprising:
   a repeating ionene unit comprising a cation distributed along a degradable backbone, and the degradable backbone comprising a terephthalamide structure, wherein the repeating ionene unit has antimicrobial functionality, and wherein the repeating ionene unit has a structure characterized by formula 1:

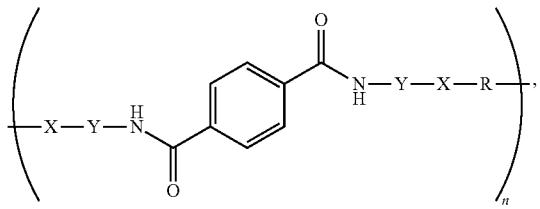

wherein X is the cation, wherein R is a hydrophobic functional group, wherein n is an integer greater than or equal to two and less than or equal to one thousand, and wherein Y is a functional group selected from the group consisting of an ester group and a carbonyl group.

2. The polymer of claim 1, wherein the cation is selected from the group consisting of a nitrogen cation and a phosphorus cation.

3. The polymer of claim 2, wherein the cation is a nitrogen cation selected from the group consisting of a protonated secondary amine cation, a protonated tertiary amine cation, a quaternary ammonium cation and an imidazolium cation.

4. The polymer of claim 3, wherein the cation is the quaternary ammonium cation.

5. The polymer of claim 3, wherein the cation is the imidazolium cation.

6. The polymer of claim 1, wherein the terephthalamide structure is derived from polyethylene terephthalate.

7. A method for making the polymer of claim 1, comprising:
   dissolving a plurality of amine monomers with an electrophile in a solvent, the plurality of amine monomers comprising a degradable backbone, and the degradable backbone comprising a terephthalamide structure; and
   polymerizing the plurality of amine monomers and the electrophile to form a repeating ionene unit, the repeating ionene unit comprising a cation located along the degradable backbone, wherein the repeating ionene unit has antimicrobial functionality, and wherein the repeating ionene unit has a structure characterized by formula 1:

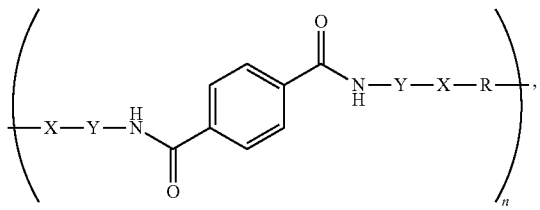

wherein X is the cation, wherein R is a hydrophobic functional group, wherein n is an integer greater than or equal to two and less than or equal to one thousand, and wherein Y is a functional group selected from the group consisting of an ester group and a carbonyl group.

8. The method of claim 7, wherein the polymerizing covalently bonds the plurality of amine monomers together, and wherein the polymerizing forms the cation by a process selected from the group consisting of alkylation and quaternization.

9. The method of claim 8, further comprising:
stirring the plurality of amine monomers, the electrophile, and the solvent at a temperature greater than or equal to 15 degrees Celsius (° C.) and less than or equal to 150° C. for a defined period of time greater than or equal to 12 hours and less than or equal to 24 hours.

10. The method of claim 9, wherein the cation is a nitrogen cation selected from the group consisting of a protonated secondary amine cation, a protonated tertiary amine cation, a quaternary ammonium cation and an imidazolium cation.

11. A polyionene composition comprising:
a repeating ionene unit comprising:
a degradable molecular backbone comprising a terephthalamide structure; and
a cation covalently bonded to the degradable molecular backbone, wherein the repeating ionene unit has antimicrobial functionality, and wherein the repeating ionene unit has a structure characterized by formula 1:

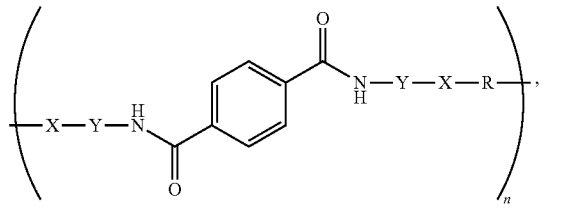

wherein X is the cation, wherein R is a hydrophobic functional group, wherein n is an integer greater than or equal to two and less than or equal to one thousand, and wherein Y is a functional group selected from the group consisting of an ester group and a carbonyl group.

12. The polyionene composition of claim 11, wherein the cation is selected from the group consisting of a protonated secondary amine cation, a protonated tertiary amine cation, a quaternary ammonium cation and an imidazolium cation.

13. A method of forming a polymer comprising:
dissolving a plurality of degradable amine monomers with an electrophile in a solvent; and
polymerizing the plurality of degradable amine monomers and the electrophile to form a precipitate, the precipitate comprising a repeating ionene unit, the repeating ionene unit comprising a cation distributed along a degradable molecular backbone, and the degradable molecular backbone comprising a terephthalamide structure, wherein the repeating ionene unit has antimicrobial functionality, and wherein the repeating ionene unit has a structure characterized by formula 1:

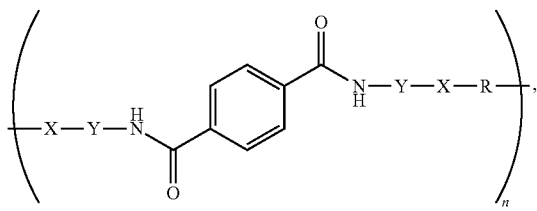

wherein X is the cation, wherein R is a hydrophobic functional group, wherein n is an integer greater than or equal to two and less than or equal to one thousand, and wherein Y is a functional group selected from the group consisting of an ester group and a carbonyl group.

14. The method of claim 13, further comprising:
preparing the plurality of degradable amine monomers through an aminolysis of polyethylene terephthalate, wherein the terephthalamide structure is derived from the polyethylene terephthalate.

15. The method of claim 14, further comprising:
stirring the plurality of degradable amine monomers, the electrophile, and the solvent at a temperature greater than or equal to 15 degrees Celsius (° C.) and less than or equal to 150° C. for a defined period of time greater than or equal to 12 hours and less than or equal to 24 hours, wherein the polymerizing forms the cation by a process selected from the group consisting of an alkylation and a quaternization.

* * * * *